United States Patent [19]

Beever

[11] 4,436,865

[45] Mar. 13, 1984

[54] POLY(ARYLENE SULFIDE) COMPOSITION SUITABLE FOR MOLDING

[75] Inventor: William H. Beever, Bartlesville, Okla.

[73] Assignee: Phillips Petroleum Company, Bartlesville, Okla.

[21] Appl. No.: 445,307

[22] Filed: Nov. 29, 1982

[51] Int. Cl.$^3$ .......................... C08K 3/02; C08K 3/40; C08K 3/36

[52] U.S. Cl. .................... 524/504; 524/493; 524/494; 524/496; 524/505; 525/64; 525/69; 525/92

[58] Field of Search .................. 524/504, 505; 525/64, 525/69, 92

[56] References Cited

U.S. PATENT DOCUMENTS

| | | | |
|---|---|---|---|
| 3,356,761 | 12/1957 | Fox | 525/391 |
| 3,725,362 | 4/1973 | Walker | 524/80 |
| 3,856,560 | 12/1974 | Blackwell | 117/132 B |
| 4,134,874 | 1/1979 | Needham | 524/431 |
| 4,143,095 | 3/1979 | Lee, Jr. | 524/141 |
| 4,145,298 | 3/1979 | Trepka | 252/51.5 A |
| 4,238,202 | 12/1980 | Trepka | 44/62 |
| 4,309,514 | 1/1982 | Lee | 525/92 |
| 4,322,507 | 3/1982 | Haap | 525/92 |
| 4,337,182 | 6/1982 | Needham | 524/609 |
| 4,355,059 | 10/1982 | Blackwell | 525/189 |

OTHER PUBLICATIONS

Derwent Abstract 80584 D/44 Sept. 1981 (J56118456).

*Primary Examiner*—John C. Bleutge
*Assistant Examiner*—Herbert J. Lilling

[57] ABSTRACT

A composition suitable for molding applications containing from about 25 to about 50 weight percent poly(arylene sulfide), from about 10 to about 30 weight percent reinforcing agent, from about 30 to about 60 weight percent fillers, from about 0 to about 3 weight percent colorant, from about 0.5 to about 2 weight percent of a processing aid and from about 0.5 to about 2 weight percent of a nitrogen-containing hydrogenated butadiene/styrene copolymer. A method for improving processability of a composition containing from about 25 to about 50 weight percent poly(arylene sulfide), from about 10 to about 30 weight percent reinforcing agent, from about 30 to about 60 weight percent of fillers, from 0 to about 3 weight percent colorant in which there is admixed with this composition a nitrogen-containing hydrogenated butadiene/styrene copolymer in the amount of about 0.5 to about 2 weight percent.

8 Claims, No Drawings

4,436,865

POLY(ARYLENE SULFIDE) COMPOSITION SUITABLE FOR MOLDING

BACKGROUND OF THE INVENTION

This invention relates to compositions containing poly(arylene sulfide). In one of its aspects this invention relates to molding compositions containing poly(arylene sulfide). In another of its aspects this invention relates to a method for preparing compositions of improved performance properties which contain poly(arylene sulfide).

The poly(arylene sulfide) compositions of this invention generally contain substantial amounts of fillers, reinforcing agents, etc., to provide the desired degree of stiffness, crack resistance, impact resistance, and the like, in articles fabricated from them. The fillers, etc., however, decrease the metal flow of the compositions thereby increasing the difficulty of molding acceptable parts. It is possible largely to compensate for the melt flow decrease by selecting a poly(arylene sulfide) resin with a high melt flow. Unfortunately, this approach can result in a composition which when molded may exhibit cracking or other physical properties of insufficient quality for the proposed end use.

Addition of the specified compounds to poly(arylene sulfide) compositions by the process of this invention results in improved performance properties for those compositions.

It is, therefore, an object of this invention to provide a composition containing poly(arylene sulfide) that is suitable for molding operations and which has good performance characteristics. It is another object of this invention to provide a method for improving performance characteristics of compositions containing poly(arylene sulfide).

Other aspects, objects and the various advantages of this invention will become apparent upon reading the specification and the attached claims.

STATEMENT OF THE INVENTION

According to this invention, a composition is provided that is suitable for use in molding operations. The composition contains about 25 to about 50 weight percent poly(arylene sulfide), from about 10 to about 30 weight percent reinforcing agent about 30 to about 60 weight percent fillers from about 0 to about 3 weight percent colorant, from about 0.5 to about 2 weight percent processing aid and from about 0.5 to about 2 weight percent nitrogen-containing hydrogenated butadiene/styrene copolymer.

In one embodiment of this invention a method is provided for improving performance characteristics of compositions containing poly(arylene sulfide) in which a composition which contains from about 25 to about 50 weight percent poly(arylene sulfide) resin, about 10 to about 30 weight percent reinforcing agent, about 30 to about 60 weight percent fillers, about 0 to about 3 weight percent colorant, and about 0.5 to about 2 weight percent processing aid has blended therein an amount of a nitrogen-containing hydrogenated butadiene/styrene copolymer in the range of about 0.5 to about 2 weight percent.

The poly(arylene sulfide) remains employed in the compositions are known polymers which have been set forth, for example, in U.S. Pat. No. 3,354,129 which issued Nov. 21, 1967 to James T. Edmonds, Jr., and Harold Wayne Hill, Jr. The resins are normally solid materials which in an uncured or partially cured state can have melt flows in terms of g/10 minutes according to ASTM Method D-1238-70 (316° C. and 5 kg load) ranging from about 800 to about 10,000, more preferably from about 1000 to about 3500. A presently preferred resin is poly(phenylene sulfide) abbreviated PPS.

The most useful reinforcing agent is glass which can be used in the form of fibers and this is preferred. In some instances, however, it may be desirable to substitute up to about 75% by weight of the glass fibers with glass beads to modify the effects contributed by the glass. The glass beads are also commercially available materials. Desirably the beads have average diameters ranging from about 10 to about 100 micrometers.

The fillers (as well as the other components) utilized in the compositions of this invention are all commercially available materials. Fillers are preferably silica but also can include others such as clay, talc, calcium carbonate, and the like.

The silica, when employed, can be of natural or synthetic origin. Preferably, a fused (vitreous) silica is used to provide the best results. Fused silica is commercially available as a finely ground material having a relatively narrow particle size distribution ranging from about 1 to about 100 micrometers. It typically contains about 99.5 weight percent $SiO_2$ with the remaining components comprising $Al_2O_3$, $Fe_2O_3$, $Na_2O$ and $K_2O$.

The processing aids of this invention preferably can be (1) $LiCO_3$, (2) organosilanes, or (3) oils or waxy compounds selected from among the N,N'-alkylenebis (alkanamides), glycerides and phosphated glycerides of saturated fatty acids containing from 10 to 30 carbon atoms, mono- and dialkanolamides derived from saturated fatty acids and esters derived from a saturated long chain fatty acid and long chain saturated aliphatic alcohol.

The organic silanes, when used in the compositions, function as coupling agents for the resin and the fillers and also appear to improve the water resistance and decrease the linear coefficient of expansion. Specific examples of compounds include gamma-glycidoxypropyltrimethoxysilane, methyltrimethoxysilane, beta-(3,4-epoxycyclohexyl)-ethyltrimethoxysilane, N-vinylbenzyl-N-2-(trimethoxysilylpropylamino) ethyl ammonium chloride, and the like. A presently preferred species is the last named compound.

The colorants, when employed, are selected from those inorganic and organic compositions which will tolerate the high molding temperatures normally used. The temperatures can range from about 300° to 600° C.(570°–1110° F.). Suitable colorants include carbon black, titanium dioxide, cadmium sulfide, cadmium sulfoselenide, phthalocyanine blue or green, iron oxide, and the like.

The nitrogen-containing copolymers useful in this invention are those described in U.S. Pat. No. 4,145,298, incorporated here by reference. They are described as oil-soluble organonitrogen compound grafted hydrogenated conjugated diene/monovinylarene copolymers with the copolymers having (1) a polymerized monovinylarene content of about 20 to 70 weight percent with the proviso that when the copolymer contains a random block, the block polymonovinylarene content is in the range of about 15 to 35 weight percent, (2) a number average molecular weight suitable for oil solubility, (3) the extent of hydrogenation of the copolymers such that about at least 95 weight percent of olefinic double bonds having been saturated and (4) less than about 5 weight percent of aromatic double bonds having been saturated. The copolymers are characterized as having been prepared by the process which comprises metalating a hydrogenated conjugated diene hydrocarbon/monovinylarene hydrocarbon copolymer, and reacting the resulting metalated hydrogenated copolymer with effective amounts of at least one nitrogen-containing organic compound. The nitrogen-containing organic compounds suitable for use in this reaction can be described by the general formulae $X\text{-}Q\text{-}(NR_2^3)_n$ or $Y[Q\text{-}(NR_2^3)_n]_m$ wherein each $R^3$ is the same or different alkyl, cycloalkyl, or aryl radicals, or combination thereof; Q is a hydrocarbon radical having a valence of $n+1$ and is a saturated aliphatic, saturated cycloaliphatic, or aromatic radical, or combination thereof. X is a functional group capable of reacting on a one-to-one basis with one equivalent of polymer lithium. Nonlimiting examples of X include such as

wherein $R^4$ is hydrogen, or an alkyl, cycloalkyl, or aryl radical or combination radical; $N\equiv C-$; $R^3N=HC-$;

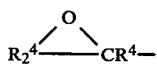

Y is or contains a functional group capable of reacting on a one-to-one basis with one equivalent of polymer lithium, such as a keto group or other similar group derived from or containing functional groups defined as X above. The n can be one or greater with the proviso that the value of n should preferably not exceed that which causes the nitrogen compound or the resulting modified polymer to be hydrocarbon insoluble; and m is 2 or 3. There is no known limit on the number of carbon atoms of any of $R^3$ or $R^4$ as far as operability is concerned. Nonlimiting examples of suitable nitrogen compounds include:

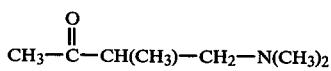

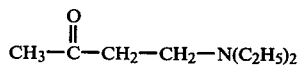

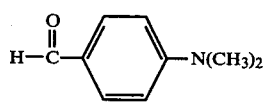

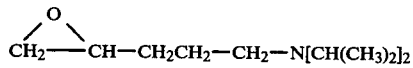

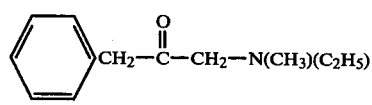

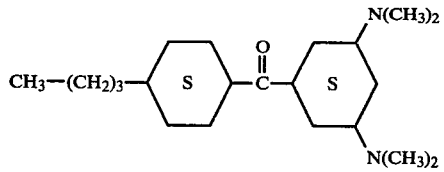

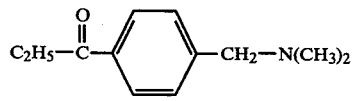

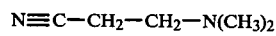

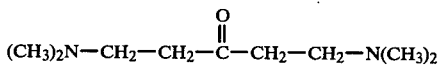

For the purposes of this invention the copolymers will have nitrogen levels ranging from about 0.01 to 0.5 weight percent and preferably the conjugated diene will be butadiene and the monovinylarene will be styrene.

The compositions of the invention can be employed in extrusion and injection molding applications such as in the fabrication of sheets, in the encapsulation of electronic components such as semiconductor devices, etc. The melt flow properties of the compositions can range from about 5 to about 800 g/10 minutes as determined according to ASTM procedure D1238-70 at 316° C. with a 5 kg weight. The higher melt flow compositions, e.g., 400 to 800 g/10 minutes, are preferably employed in injection molding applications. The lower melt flow compositions are more conveniently used in extrusion.

The compositions can be prepared, for example, by first mixing the components together in a rotating drum blender or in an intensive mixer such as a Henschel mixer and then compounding the resulting mixtures above the melting point of the resin by means of an extruder, etc., to produce a uniform blend. The final blend after chopping or pelleting is introduced into the extruder or injection molder as the feed.

To illustrate the invention the following examples are presented which should be taken as illustrative and not exclusive.

EXAMPLE I

This example is a control and describes the procedure used for preparing and evaluating the samples herein described. A typical method of preparation is as follows: Into a Welex Blender were added 438 grams of 0.125 inch milled glass fibers (Owen-Corning) and while stirring there were added dropwise 23 grams of a 40 weight percent methanol solution of N-vinylbenzyl-N-2-(trimethoxysilylpropylamino) ethyl ammonium chloride (Z6032, Dow Corning). The mixture was placed in a fiber drum along with 1022 grams of polyphenylene sulfide polymer (FS-1, Phillips Petroleum Co.), 1459 silica and 29 grams carbon black (N110, Phillips Petroleum Co.) and the total mixture tumbled for about 5 to 10 minutes. The mixture was extruded through a Davis Standard extruder at 600F (316C), ground to a powder in a grinder, dried in a 350F (177C) oven for 3 hours and molded into bar specimens, 8 inches × 1 inch × 0.125 inch, using a New Britain molding machine (barrel 600F, mold 275F). Performance properties were then determined to establish a standard for subsequent comparisons. These values are listed in Table I.

EXAMPLE II

This example is a control and demonstrates the improvement in performance properties brought about by the addition of a fatty acid amide. The procedure described in example I was repeated except an additional ingredient, 29 grams of N,N'-ethylene bis-stearamide (Acrawax C) was added to the mixture just before tumble mixing. The affect of this additive on performance properties is listed in Table I where it is seen that the additive improves flow rate, flexural strength, tensile break, elongation and Izod impact as compared to the control of Example I where no stearamide was used.

EXAMPLE III

This example illustrates the invention showing the improvement in performance properties when a nitrogen-containing conjugated diene-monovinyl aromatic copolymer is used as an additive instead of the stearamide of Example II. The procedure described in Example II was repeated except 29 grams (1 weight percent of total) of a nitrogen-containing (0.1 weight percent nitrogen) hydrogenated 41/159 butadiene/styrene copolymer was added before tumble mixing instead of the stearamide. These results are listed in Table I along with the controls of Examples I and II where an improvement can be seen in performance properties brought about by the use of the nitrogen-containing copolymer, particularly the improvement in flexural strength and unnotched Izod impact.

TABLE I

Effect of Additives on the Performance Properties of Glass-Filled Polyphenylene Sulfide-Based Polymer Compositions

| Formulation: | Wt. % | Ingredients |
|---|---|---|
| | 34.06 | Polyphenylene Sulfide (FS-1) |
| | 14.60 | .125 inch Fiberglass |
| | 48.63 | Silica |
| | 0.77 | Organosilane |
| | 0.97 | Carbon Black N110 |
| | 0.97 | Additive |
| | 100.00 | |

| | Additive | | |
|---|---|---|---|
| | Controls | | Invention |
| Performance Properties[a] | No Additive | Stearamide[b] | N-Contg. copolymer[c] |
| 1. Flow Rate, g/10 min. | 18.2 | 12.2 | 12.5 |
| 2. Density, g/cc | 1.83 | 1.78 | 1.81 |
| 3. Flexural Modulus, MPa | 17,037 | 17,067 | 17,108 |
| 4. Flexural Strength, MPa | 40.7 | 52.4 | 71.3 |
| 5. Tensile Break, MPa | 22.8 | 33.2 | 37.4 |
| 6. Elongation % | 0.21 | 0.48 | 0.51 |
| 7. Izod Impact, Joules/m | | | |
| Notch | 28.8 | 35.6 | 38.7 |
| Unnotched | 34.1 | 44.9 | 75.6 |

[a]Melt Flow run according to ASTM D1238
Density according to ASTM D1505
Flexural Strength and Modulus according to ASTM D790
Tensile Break and % Elongation run according to ASTM D638
Izod Impact run according to ASTM D256
[b]N,N'—ethylene bis-stearamide
[c]Nitrogen-containing (0.1 weight percent nitrogen) hydrogenated 41/159 butadiene/styrene copolymer

I claim:
1. A composition suitable for molding comprising:
   (a) from about 25 to about 50 weight percent poly(arylene sulfide),
   (b) from about 10 to about 30 weight percent reinforcing agent,
   (c) from about 30 to about 60 weight percent filler,
   (d) from about 0.5 to about 2 weight percent of processing aid,
   (e) from zero to about 3 weight percent colorant, and
   (f) from about 0.5 to about 2 weight percent of an oil-soluble organonitrogen compound grafted hydrogenated conjugated diene/monovinylarene copolymer having (1) a polymerized monovinylarene content of about 20 to 70 weight percent with the proviso that when said copolymer contains a random block, the block polymonovinylarene content is in the range of about 15 to 35 weight percent, (2) a number average molecular weight suitable for oil solubility, (3) the extent of hydrogenation of said copolymer such that about at least 95 weight percent of olefinic double bonds having been saturated and (4) less than about 5 weight percent of aromatic double bonds having been saturated, said copolymer characterized as having been prepared by the process which comprises metalating a hydrogenated conjugated diene hydrocarbon/monovinylarene hydrocarbon copolymer, and reacting the resulting metalated hydrogenated copolymer with effective amounts of at least one nitrogen-containing organic compound represented by the general formulae $X-Q-(NR_2^3)_n$ or $Y[Q-(NR_2^3)_n]_m$ wherein each $R^3$ is the same or different alkyl, cycloalkyl, aryl, or combination radical, Q is a hydrocarbon radical having a valence of $n+1$ and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, and m is 2 or 3, thereby preparing said grafted copolymer.

2. A composition of claim 1 wherein X is selected from

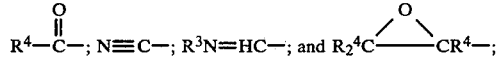

wherein each $R^4$ is the same or different and is hydrogen, alkyl, cycloalkyl, aryl, or combination radical, and Y is or contains an X group.

3. A composition of claim 1 wherein the nitrogen content of the copolymer of (f) is in a range of about 0.01 to about 0.5 weight percent, the conjugated diene is butadiene and the monovinylarene is styrene.

4. A composition of claim 3 wherein said poly(arylene sulfide) is polyphenylene sulfide, said reinforcing agent is glass fibers, said filler is silica, said processing aid is N-vinylbenzyl-N-2-(trimethoxysilylpropylamino) ethyl ammonium chloride, and said colorant is carbon black.

5. A method for improving processability of a composition comprising from about 25 to about 50 weight percent poly(arylene sulfide), from about 10 to about 30 weight percent reinforcing agent, from about 30 to about 50 weight percent filler, from about 0.5 to about 2 weight percent of a processing aid and from zero to about 3 weight percent colorant and said method comprising the addition to said composition of from about 0.5 to about 2 weight percent of an oil-soluble organonitrogen compound grafted hydrogenated conjugated diene/monovinylarene copolymer having (1) a polymerized monovinylarene content of about 20 to 70 weight percent with the proviso that when said copolymer contains a random block, the block polymonovinylarene content is in the range of about 15 to 35 weight percent, (2) a number average molecular weight suitable for oil solubility, (3) the extent of hydrogenation of said copolymer such that about at least 95 weight percent of olefinic double bonds having been saturated and (4) less than about 5 weight percent of aromatic double bonds having been saturated, said copolymer characterized as having been prepared by the process which comprises metalating a hydrogenated conjugated diene hydrocarbon/monovinylarene hydrocarbon copolymer, and reacting the resulting metalated hydrogenated copolymer with effective amounts of at least one nitrogen-containing organic compound represented by the general formulae $X-Q-(NR_2^3)_n$ or $Y[Q-(NR_2^3)_n]_m$ wherein each $R^3$ is the same or different alkyl, cycloalkyl, aryl, or combination radical, Q is a hydrocarbon radical having a valence of $n+1$ and is a saturated aliphatic, saturated cycloaliphatic, aromatic or combination radical, X is a functional group capable of reaction on a one-to-one basis with one equivalent of polymer metal, Y is or contains a functional group capable of reacting on a one-to-one basis with one equivalent of polymer metal, n is at least one, and m is 2 or 3, thereby preparing said grafted copolymer.

6. A method of claim 5 wherein X is selected from

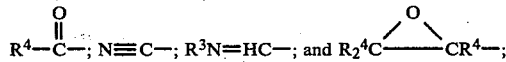

wherein each $R^4$ is the same or different and is hydrogen, alkyl, cycloalkyl, aryl, or combination radical, and Y is or contains an X group.

7. A method of claim 5 wherein the nitrogen content of the copolymer of (f) is in a range of about 0.01 to about 0.5 weight percent, the conjugated diene is butadiene and the monovinylarene is styrene.

8. A method of claim 7 wherein said poly(arylene sulfide) is polyphenylene sulfide, said reinforcing agent is glass fibers, said filler is silica, said processing aid is N-vinylbenzyl-N-2-(trimethoxysilylpropylamino) ethyl ammonium chloride, and said colorant is carbon black.

* * * * *